United States Patent [19]
Heflin

[11] Patent Number: 5,907,690
[45] Date of Patent: May 25, 1999

[54] MODULAR INTERFACE DEVICES FOR A DISTRIBUTED INPUT/OUTPUT SYSTEM

[75] Inventor: Daniel Lee Heflin, Front Royal, Va.

[73] Assignee: Lockheed Martin Corporation, Bethesda, Md.

[21] Appl. No.: 08/071,920

[22] Filed: Jun. 3, 1993

[51] Int. Cl.⁶ .................................................. G06F 13/38
[52] U.S. Cl. .......................................... 395/309; 395/832
[58] Field of Search .................................... 395/275, 500, 395/309, 832; 364/238.3, 242.4, 242.5

[56] References Cited

U.S. PATENT DOCUMENTS

| | | | |
|---|---|---|---|
| 4,124,889 | 11/1978 | Kaufman et al. | 395/275 |
| 4,313,160 | 1/1982 | Kaufman et al. | 395/275 |
| 4,680,753 | 7/1987 | Fulton et al. | 370/85.8 |
| 4,764,868 | 8/1988 | Ketelhut et al. | 395/275 |
| 4,905,219 | 2/1990 | Barr et al. | 359/139 |
| 5,243,699 | 9/1993 | Nickolls et al. | 395/275 |

*Primary Examiner*—Zami Maung
*Attorney, Agent, or Firm*—Stanton D. Weinstein; Lane, Aitken and McCann

[57] ABSTRACT

In a control system for controlling a very large number of remotely located input and output devices there is provided a novel control system having a single CPU coupled through a host interface module to a data and control transmission line. The host interface module on the transmission line receives information from and transmits information to a plurality of secondary interface modules having node addresses. The information being transmitted on the control and data transmission line is formatted to comprise one or two data bytes, an address and command byte, and an error checking byte to permit operation in a noisy electrical environment. Each said interface modules is further provided with high speed logic and an address counter for identifying node addresses and carrying out the commands and transmission of data without the requirement for software or firmware.

12 Claims, 5 Drawing Sheets

MODULAR INTERFACE DEVICES FOR A DISTRIBUTED INPUT/OUTPUT SYSTEM

BACKGROUND OF INVENTION

1. Field of the Invention

The present invention relates to a novel hardware controlled multinode interface module for a control system. more particularly, the present invention relates to a highly distributed and highly modular interface implemented in hardware and employing a plurality of data error checking features which permit hot swapping of the interface modules on the control systems without degrading the system or causing temporary shutdown of the system.

2. Description of the Prior Art

Numerous control systems for controlling factory operations and processes are known. When such prior art control systems employed a large number of input/output controls located remotely from a central processor having racks of control equipment, individual cabling was run from the central processor racks to the input/output controls at the devices being controlled which require a large amount of system cabling. When a plurality of input/output (I/O) boards are employed and each such boards is provided with a plurality of input/output drivers and receivers each of which requires a pair of wires, the cabling for a large number of discrete I/O devices becomes the major limiting factor in a highly centralized I/O control system.

To avoid the above limitations imposed by a centralized I/O architecture, it was known to employ distributed computer architecture having individual computing systems located at remote sites and adapted to cooperate with the central host computing system and control system. Such distributed architecture systems also require an extensive amount of cabling as well as the additional expense of individual computing systems.

It has been suggested that a control system could be centralized and the commands linked to the input/output controls by local area network (LAN) techniques. Most such LAN systems requires smart controllers such as ETHERNET controllers or a smart terminal controller either of which increases the expense of the LAN systems. Most such LAN systems have a limited number of nodes which is a function of the transmission line effect and the speed of signal transmission. Typically such LAN systems have no more than 30 nodes.

Control systems which are designed to control a very large number of input/output devices and which employ a large number of nodes in a distributed system, by definition imply that the input/output devices are spread over a large area and will require large amounts of cabling. When such input/output devices are spread over a large area and include a large amount of cabling, the input/output devices and the transmission equipment are subject to industrial noise and industrial environmental conditions which generate electrical noise that in turn will produce errors and make it impossible to accurately control the input/output devices on a distributed system having a large number of nodes and a large number of input/output devices.

It would be desirable to provided a control system having a novel hardware controlled multinode interface (HCMI) which is capable of controlling more than 65,000 discrete I/O devices through approximately 256 nodes in a highly distributed architecture system such that the data required to accomplish control may be transmitted on a signal pair of conductors with associated control lines.

SUMMARY OF THE INVENTION

It is a principal object of the present invention to provide a control system having a novel distributed modular interface.

It is a principal object of the present invention to provide a control system that is operable in a hostile electrical environment.

It is a principal object of the present invention to provide a control system that permits hot swapping of the novel modular interfaces and their associated I/O devices under control.

It is a principal object of the present invention to provide a novel modular interface module having hardware implemented protocols which avoids the need for a CPU in the interface module and enhances the speed of operation of the control system.

It is a principal object of the present invention to provide a novel modular interface board which is provided with modular input/output blocks and expansion blocks.

It is a principal object of the present invention to provide an address counter in each modular interface which generates an active secondary HCMI address for receiving and transmitting information.

It is a principal object of the present invention to provide a novel modular interface module having a plurality of error checking features.

It is a principal object of the present invention to provide a novel modular interface module that automatically accepts a data stream of three or four bytes without a preamble, start bits, stop bits, and node address fields.

It is a principal object of the present invention to provide a novel modular interface which connects in parallel to a data and control transmission line such that removal from or addition to the control system does not entail any modification of the existing control system.

It is a principal object of the present invention to provide a sampling clock for sampling inputs from the input blocks at the secondary nodes and for reporting changes of state to the novel modular interface system.

It is a principal object of the present invention to provide a novel modular interface for control systems such as environmental, security, fire and smoke warning, smart home controls, training simulators as well as process and factory controls.

According to these and other objects of the present invention there is provided a novel control system having a plurality of input/output interface modules connected in parallel onto a data and control transmission line. A CPU is coupled through a host interface module to the transmission line and receives from and transmits to the transmission line information for a plurality of secondary interface modules. The information passed on the transmission line is formatted to combine one or two data bytes, an address byte, and an error checking byte to permit operation in a noisy electrical environment. Each interface module is further provided with both high speed hardware logic and an address counter for implementing the receipt and transmission of data.

DETAILED DESCRIPTION OF THE PREFERRED EMBODIMENT

Figure 1:
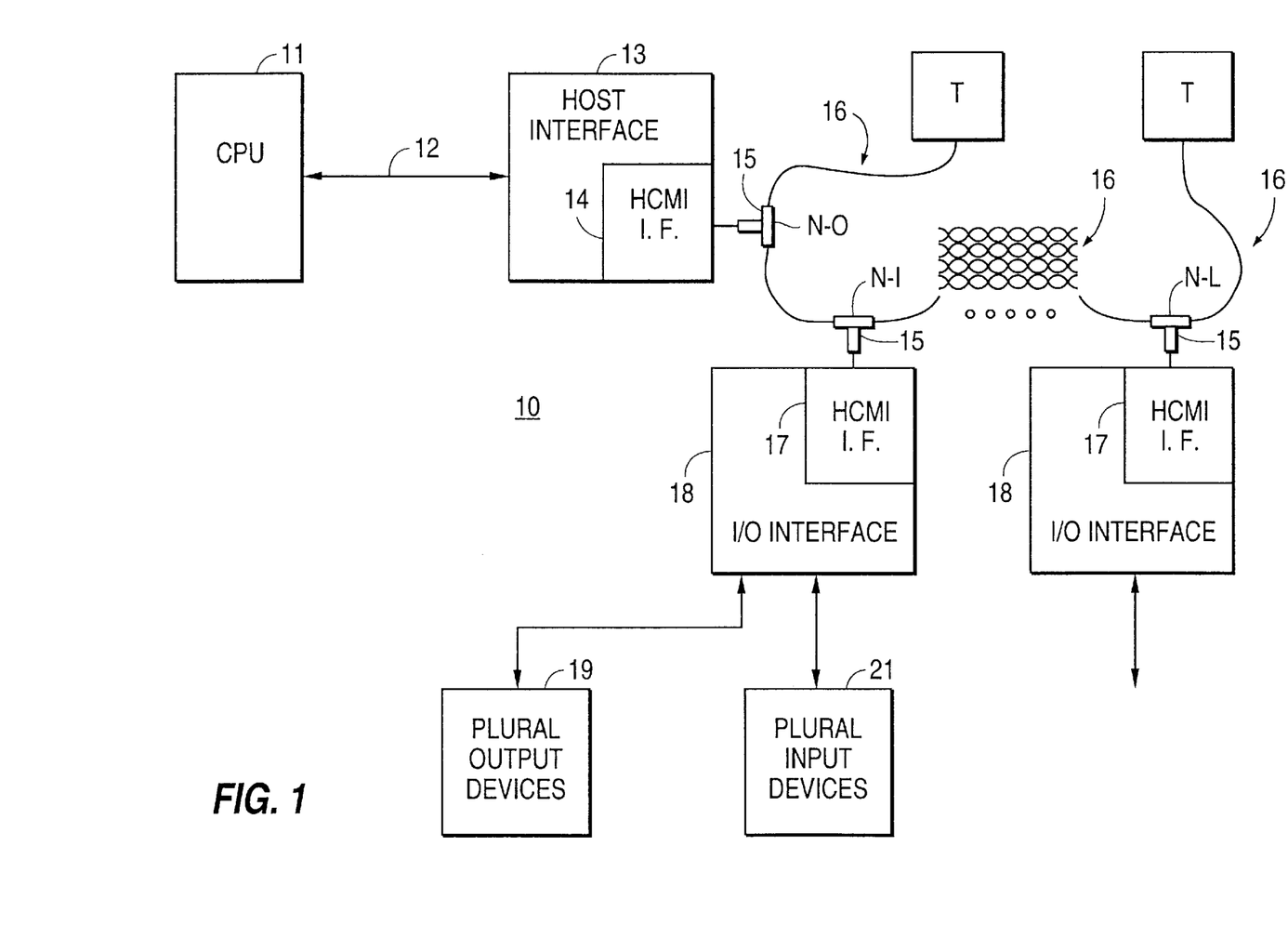
FIG. 1 is a schematic block diagram of a control system showing a plurality of novel hardware controlled multinode interfaces (HCMI) modules connected together to effect input/output control.

Refer now to FIG. 1 showing a schematic block diagram of a preferred embodiment control system 10 having a CPU 11 coupled by a bus 12 to a host interface 13. The host interface 13 is provided with a host hardware controlled multinode interface (HCMI) 14. The host HCMI is shown coupled by a Tee or parallel connector 15 on a novel transmission line 16 which will be explained in greater detail hereinafter.

The transmission line 16 is shown provided with impedance matching terminators T at each end of the transmission line and is provided with a node N-0 at the host HCMI 14. Node N-1 to the last node N-L are coupled through Tee connectors 15 to a plurality of secondary HCMIs 17 provided in each of the I/O interfaces 18 and may number up to 255 such nodes and secondary HCMIs. The I/O interfaces 18 are shown connected to a plurality of output devices 19 and a plurality of input devices 21. It will be understood that each of the I/O interfaces 18 will accommodate up to 16 inputs and 16 outputs without expansion which will be explained hereinafter. Each of the HCMI modules 14 and 17 are connected in parallel to the transmission line 16. In the preferred embodiment of the present invention, the simplest and most reliable economical form of transmission line comprises 4 twisted pairs as shown diagrammatically in FIG. 1. However, it will be understood that any transmission line which provides the same transmitting capability as four twisted pairs may be employed such as a fiber optic cable and/or coaxial cables. The use of such cables would entail more expensive forms of drivers and receivers at either end than the preferred embodiment twisted pairs. Thus, whatever form of transmission line 16 is used, the Tee (or parallel) connection 15 is preferably made in the form of a parallel connection on all four lines.

Figures 2, 3:
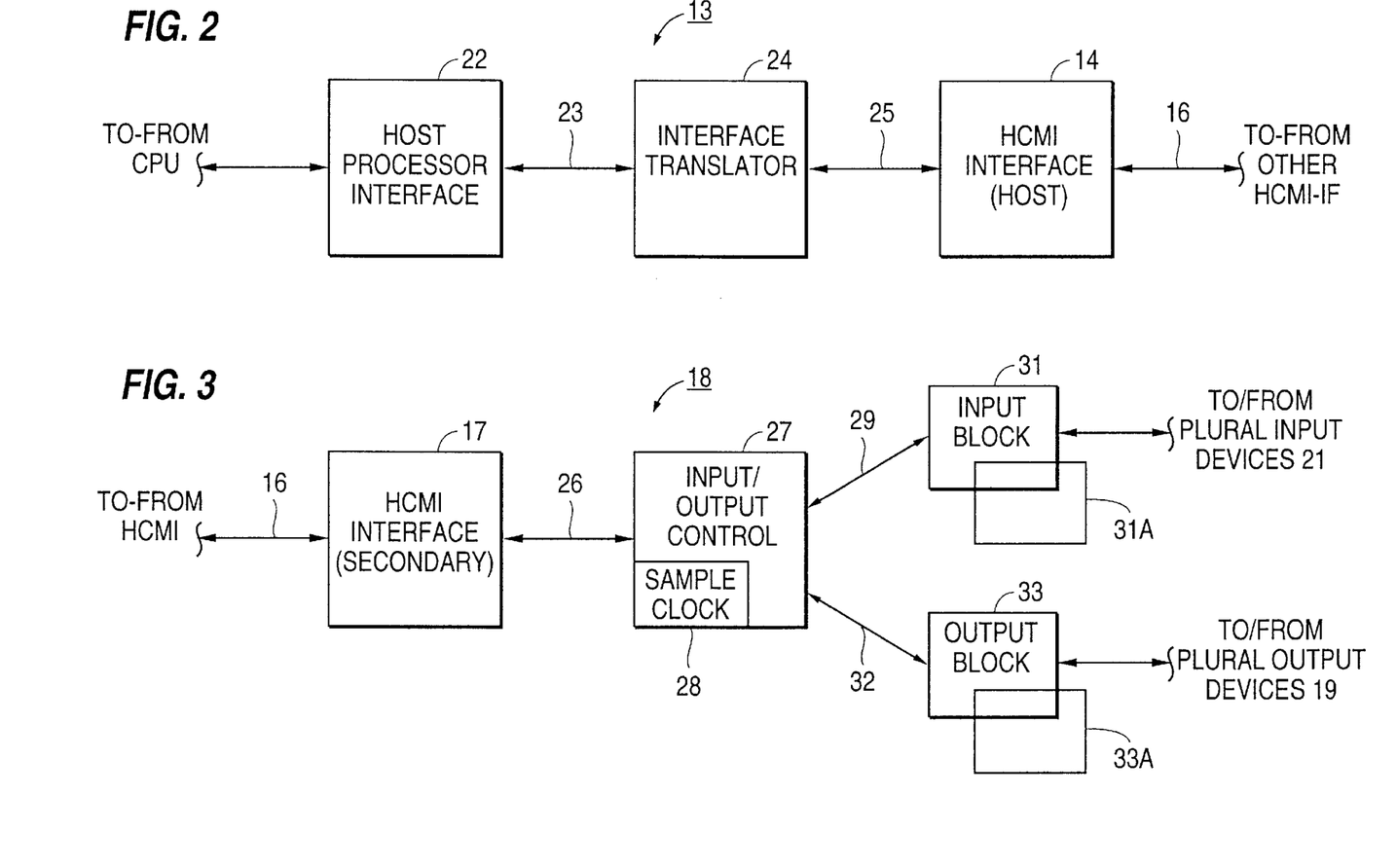
FIG. 2 is a schematic block diagram of the host interface shown in FIG. 1 having a novel hardware controlled multinode interface (HCMI)
FIG. 3 is a schematic block diagram of a secondary interface module (HCMI) coupled to input/output monitoring controls for controlling input/output blocks and expansion blocks which further control plural input/output devices.

Refer now to FIG. 2 showing a schematic block diagram of the host interface 13 which comprises a host processor interface 22 coupled by a bus 23 to an interface translator 24 which in turn is coupled by a bus 25 to the novel host HCMI 14 to be explained in greater detail hereinafter.

Refer now to FIG. 3 showing a schematic block diagram of one the secondary HCMI interface modules 17 coupled to input/output devices. The I/O interface 18 comprises a secondary HCMI 17 which is coupled by a bus 26 to an input/output control 27 having a sample clock 28 to be explained in greater detail hereinafter. The input/output control 27 is shown coupled by bus 29 to an input block 31. The input block 31 is shown having expansion blocks 31A etc. Further, the input/output control 27 is shown coupled by bus 32 to output block 33 which is provided with expansion blocks 33A. It will be understood that each block 31 is capable of monitoring 16 input devices and each of the expansion blocks is capable of monitoring an additional 16 input devices up to seven expansion blocks for each of the input blocks 31 which provides the capability of monitoring 128 input devices 21. In similar manner the output block 33 is capable of controlling up to 16 output devices 19 and each expansion block 33A thereon, up to seven expansion blocks, is capable of controlling an additional 16 output devices 19 for a total of 128 output devices 19.

The sample clock 28 is employed to sample each of the input devices 21 up to 128 devices and determine if a state change has occurred during each 1/40th of one second and to report and record the information to a buffer in input/output control 27 so that the information can be reported back to the CPU 11 during the transmission time for the HCMI 17. Information being transmitted to the output devices 19 from the CPU 11 is buffered in the input/output controls 27 and transmitted directly to the output device 19.

Figure 4:
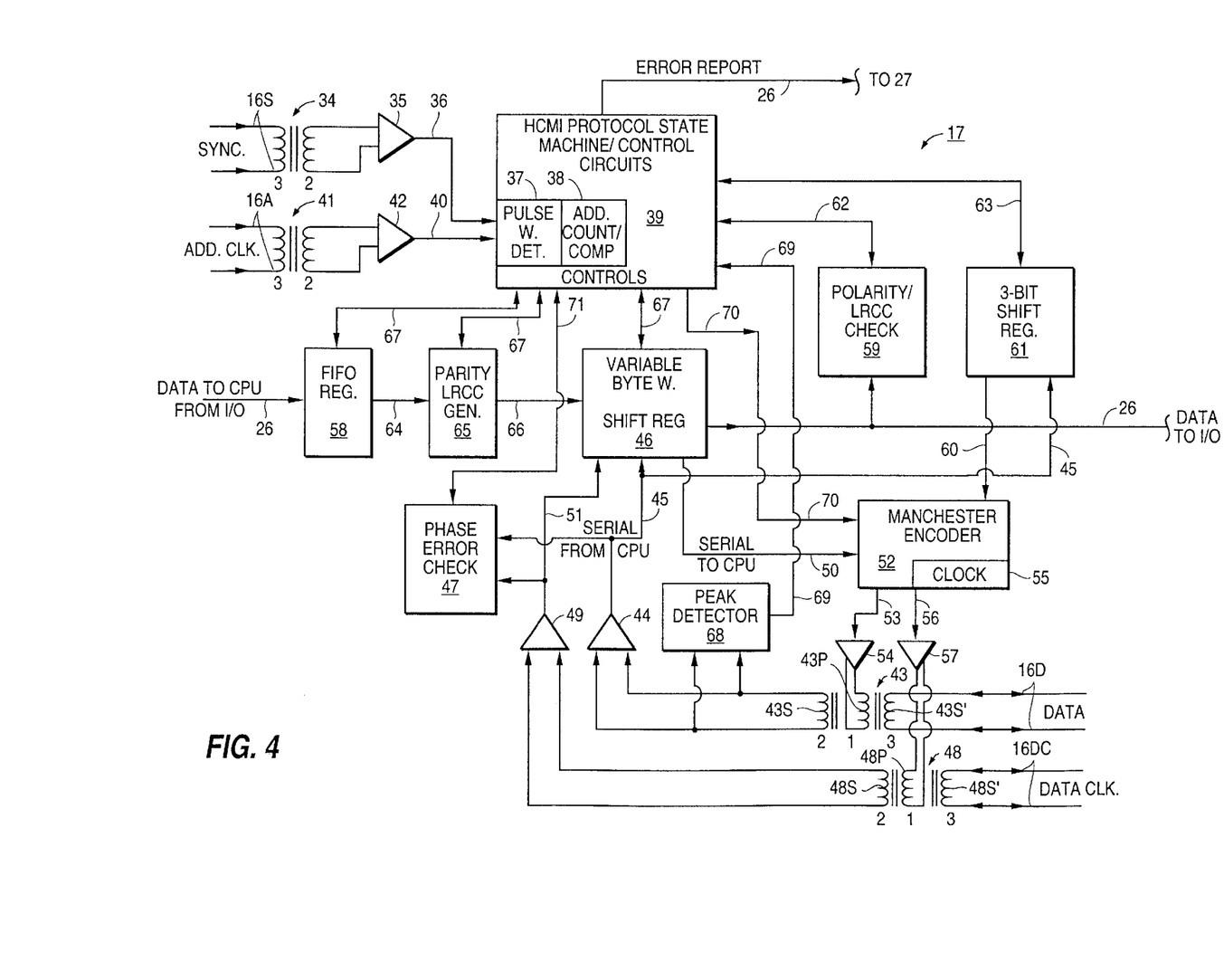
FIG. 4 is a detailed schematic block diagram of a secondary HCMI module shown in FIGS. 1 and 3.

Refer now to FIG. 4 showing a more detailed schematic block diagram of a secondary modular interface module 17. As also shown in FIGS. 1 and 3 the HCMI 17 has a plurality of inputs on transmission line 16. The four twisted pairs shown in FIG. 1 comprise a sync pulse pair 16S coupled through a transformer 34 to a receiver amplifier 35 having an output line 36 applied to a pulse width detector 37. The pulse width detector 37 has an output coupled to an address counter and comparator 38 which is part of the logic hardware controls of the HCMI protocol state machine 39. A second and distinct input on a separate twisted pair 16A is shown as the address clock coupled through a transformer 41 to a receiver amplifier 42 coupled to the pulse width detector 37 via line 40. The third input/output to the HCMI module 17 is shown as a twisted pair 16D labelled data which is coupled through a transformer 43 having 3 windings one of which is shown as the secondary 43S for receiving only. The secondary winding 43S is shown coupled to receiver amplifier 44 having an output 45 coupled to a variable byte width shift register 46 and to a phase error checker 47. In similar manner the fourth twisted pair 16DC shown as the data clock input to transformer 48 having a secondary winding 48S coupled to a receiver amplifier 49 which has an output 51 that is coupled to the aforementioned phase error checker 47 and the shift register 46.

The data and data clock lines 16D, 16DC that are coupled to transformers 43 and 48, are bidirectional lines each of which employ one of the twisted pairs 16. Information being transmitted onto the transmission line 16 is applied from shift register 46 via line 50 to the Manchester Encoder 52 that provides a biphase encoded signal on line 53 that is applied to the driver amplifier 54 having its output coupled to the primary transformer winding 43P. Encoder 52 is controlled via line 70 by control circuits 39. Signals applied to the primary winding 43P are sensed at the secondary winding 43S' and generated as signals on the twisted pair 16D labeled as data. The biphase encoder 52 is shown having a data clock 55 which generates a clock signal which accompanies the data being applied to transformer 43. The clock signal on line 56 is applied to a driver amplifier 57 which has an output coupled to the primary winding 48P of transformer 48 that generates the data clock signal on the twisted pair line 16DC. Signals generated on the primary winding 48P are sensed at the secondary winding 48S' applied to the transmission line 16DC so that the host HCMI 14 is able to sense the data clock and compare it with the data to determine if there is a biphase error and to decode the data signal.

Having explained the four principle lines comprising the transmission line 16 coupled to the HCMI 17, the only other input/output lines are from the bus 26. Bus 26, shown in FIG. 3, is shown in FIG. 4 providing data to and from the I/Os on bus 26. Data input is applied to the first-in and first-out buffer register 58. Data output from shift register 46 on line 26 is applied to the LRCC error checker 59. The third line of the bus 26 is shown as a error reporting output 26 from state machine 39 to the input/output control 27. Output of the LRCC error checker 59 on line 62 coupled as an input to the control circuits 39. Similarly the 3 byte shift register 61 is shown having a data input 45. Output lines 60 and 63 are coupled to the control circuits 39 and encoder 52 respectively.

The data into the HCMI 17 from the buffer register 58 on line 64 is shown as being applied to a parity and LRCC generator 65 which generates the parity byte and the LRCC byte is applied to register 46 via line 66. Register 46 and 58 and generator 65 are coupled bidirectionally to the control circuits 39 via control lines 67. The information generated by generator 65 is passed through the shift register 46 to the encoder 52 via line 50 and transmitted onto the data line 16D. The transmission line 16 is coupled to the host HCMI 14 as explained hereinbefore. The data from the CPU on line 16D being applied to the transformer 43 is checked five different ways. The information at the secondary winding 43S of the transformer 43 is coupled to a peak detector 68 which determines if either noise or additional pulses are coinciding with the coded data to generate a larger analog signal than is expected which would be indicative of noise or an electrical error. If an error is detected the condition is presented on line 69 which is shown coupled as an input on line 69 to the control circuits 39 as one of the five error conditions being monitored.

A second error condition is monitored in the phase error checker 47 which compares the data clock on line 51 with the data on line 45 to determine if an error condition exists. An error signal is coupled by the bidirectional control line 71 to the control circuits 39.

After the data is shifted into the shift register 46, the data is available on output line 26 which is coupled to parity and LRCC checker 59 which senses either a parity error or an LRCC byte error. The two error conditions are coupled to the control circuits 39 via the bidirectional control line 62.

A fifth error condition is sensed by the pulse width detector 37 in the control circuits 39. The sync pulse on line 16S which is applied through transformer 34 to the receiver amplifier 35 applies a sync signal via line 36 to the pulse width detector 37 that is compared with a known width pulse generated within detector 37 to determine if the pulse received has a valid width data pulse or is electrical noise. Similarly the width of the address pulse is sensed.

Having explained that five different error checking features are employed to check to determine if the data on line 16D to the HCMIs 14 and 17 is valid data or data corrupted by electrical noise, it will be appreciated that the control circuits 39 are now capable of producing a 3 byte acknowledge signal in register 61 via line 63 confirming that data received is valid data or generating a 3 byte negative acknowledge signal in shift register 61 which indicates that the data received was not valid and should be transmitted again. It will be appreciated that the error checking features of each of the error checking systems are complementary to each other and do not attempt to correct the data but raise requests that the data be retransmitted.

Having explained that each of the secondary HCMIs 17 and the host HCMI 14 have the same basic structure shown in FIG. 4 it will be appreciated that the data being trans- mitted between HCMIs is in a format which permits the five data error checks between HCMIs. It further it will be appreciated that the input/output controls 27 in FIG. 3 have an HCMI 17 at each of the locations where the input/output devices are located, thus any error that occurs after the information is formatted at the location of the input/output device will be detected when received at the host HCMI before being sent to the CPU 11. Further, information being transmitted from the CPU 11 down line to any of the possible 255 nodes is also checked before being applied to the input/output devices which if not done could create an error in a controlled condition. In the preferred embodiment of the present invention only three attempts are made to transmit error free data between the CPU 11 and an input or output device before generating an error reporting condition to the CPU via error reporting line 26 (shown as an output from the control circuits 39).

Figure 5:
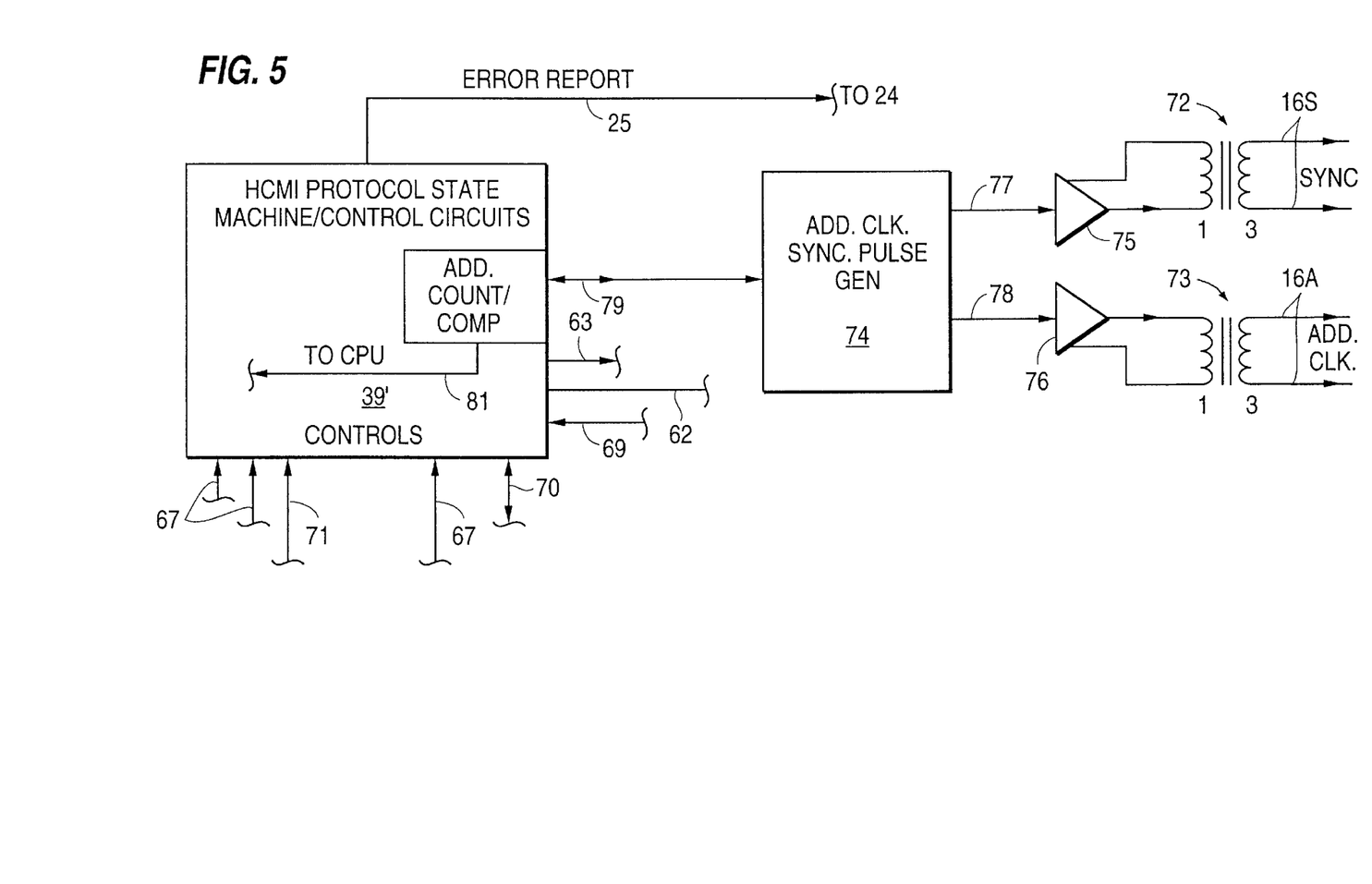
FIG. 5 is a partial schematic block diagram showing the additional elements which are are employed in a host modular HCMI module of the type shown in FIG. 4.

Refer now to FIGS. 4 and 5 which together constitute a HCMI 14. The input shown in FIG. 4 to receiver amplifiers 35 and 42 are shown removed in FIG. 5. The HCMI 14 does not required these singular directional input signals because the HCMI 14 is generating the original sync pulse on line 16S as shown in FIG. 5 and is generating the original address clock on lines 16A also shown in FIG. 5. Thus, the received address clock and sync pulse may be disabled on the module used as a host HCMI 14. The host HCMI 14 requires the modification shown on FIG. 5 comprising a sync pulse generator 74 having higher ratio windings in the transform- ers 72 and 73. The sync pulse and address clock transformers 72, 73 have primary to secondary winding ratios of 1 to 3. The HCMI 14 generator 74 is shown generating the address clock and sync pulses on lines 16A and 16S. Generator 74 is coupled to the drivers 75 and 76 via lines 77 and 78 to produce the sync pulse and address clock signals that are applied to the transmission lines 16. The address clock and sync pulse generator 74 is coupled to the HCMI protocol and control circuits 39' via line 79 which has a copy of the address clock and sync pulse which are on line 77 and 78. Thus, the address clock and sync pulse signals on line 79 are similar to those previously described with reference to FIG. 4. These inputs are now applied as inputs to the address counter and comparator circuit 38. The HCMI 14 address count compare circuit 38 is comparing the count of its counter with the maximum count of the number of nodes on the transmission line 16 whereas the address counter com- parator 38 in the HCMIs 17 are comparing the address count with the HCMI address at any particular numbered node. Thus, it is understood that the address count compare circuits 38 are identical but are comparing with different fixed inputs. The address compare output of the address counter 38 in FIG. 5 on line 81 is coupled to the CPU 11. The address compare on line 79 is coupled to the address clock pulse generator 74 and lines 16S, 16A. The sync pulse from generator 74 starts a new count cycle at all HCMIs.

The address on line 81 serves two functions. First it is appended onto coming data from the other HCMI lines to identify which node transmitted the information being received and being sent to the CPU. Second the address on line 81 is supplied to the interface translator 24 to identify a memory location in the memory of the interface translator 24 from which information will be transmitted over the bus 25 to the HCMI 14 for transmission on transmission line 16 as shown in FIG. 2.

Figures 6A, 6B:
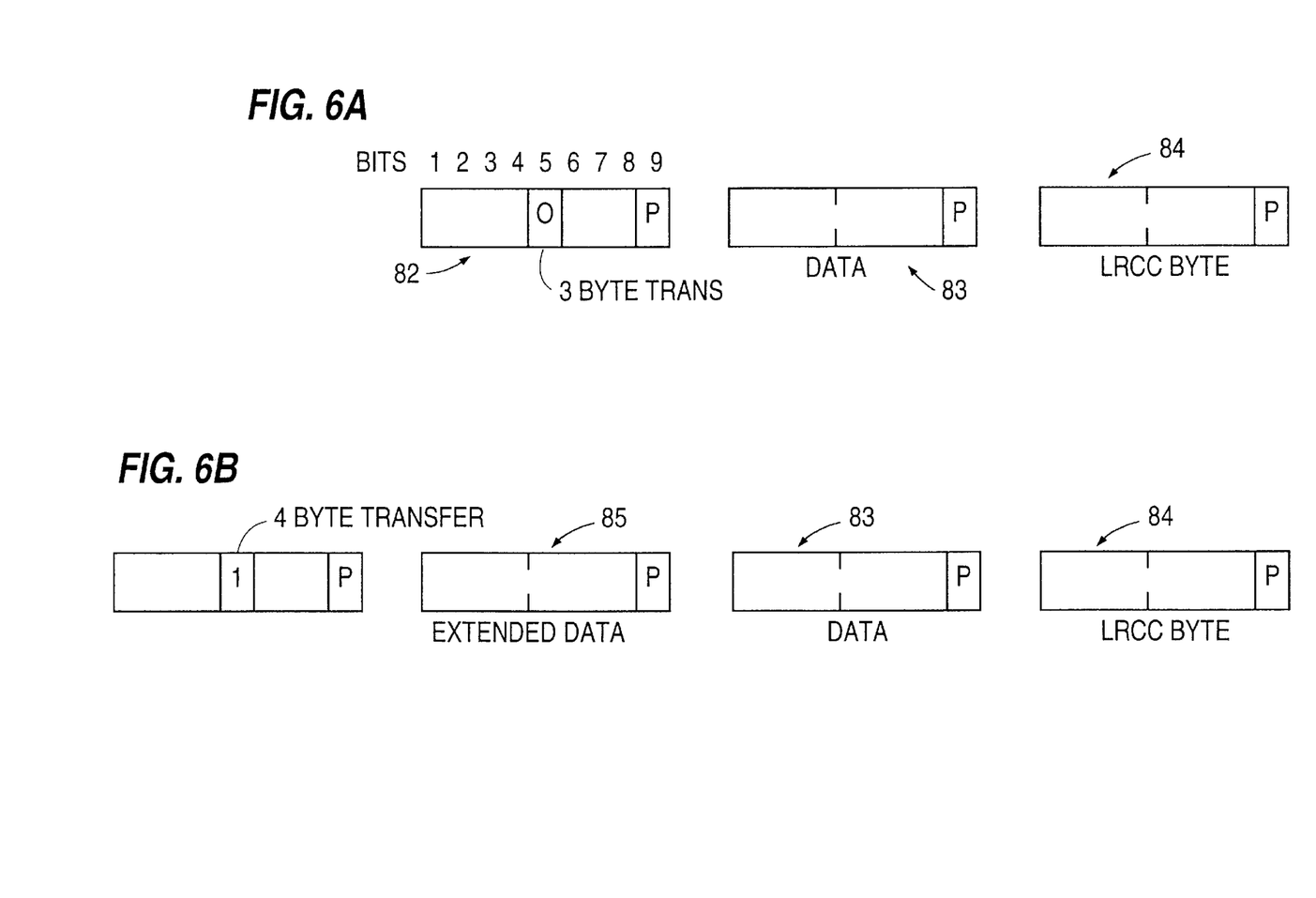
FIGS. 6A and 6B are block diagrams showing the byte structure of digital information transmitted between HCMIs on the data transmission line shown in FIG. 1.

Refer now to FIG. 6A showing a block diagram of the byte structure of digital information which is transmitted on transmission line 16 between HCMIs 14 and 17 and vice versa. Byte 82 is shown comprising a distinct address and command in the 9 bits labelled 1 through 9. The bits B1 through B4 are shown as address bits which indicate the expansion boards 31A, 33A shown in FIG. 3. If zeros are used in this address then it indicates the original input/output block 31 or 33 as distinguished from the expansion blocks 31A and 33A. Bit 5 of byte 82 is either a zero or a 1 indicating whether there are 3 bytes or 4 bytes of information being transferred. Bits B6 through B8 are used for command information and bit B6 of this command information indicates whether the information is for an input block or output block 31 or 33. The bit B9 is used as a parity bit for the other 8 bits. Byte 82 is followed by a data byte 83 containing the data being transferred to or from the HCMIs as well as to and from the computer to an input/output device. The LRCC byte 84 is a nine bit byte using an implementation of longitudinal redundancy check character (LRCC) and is a well known error checking method which does not require additional explanation. In each of the LRCC bit positions there is a character similar to a parity check of the other bits in the other bytes.

Refer now to FIG. 6B showing a byte 82 which is identical to the byte 82 shown in FIG. 6A but has a different state condition in bit 5 indicative of a 4 byte transfer. When this character is read into the shift register 46 of FIG. 4 and is transmitted by directional control line 67 into the control circuits 39, the HCMI 17 is appraised of the fact that two data bytes will be transferred constituting a 4 byte transfer as distinguish from the 3 byte transfer as shown in FIG. 6A. Thus, the ew byte or extended data byte 85 follows the first byte 82 and the subsequent third and fourth bytes 83 and 84 are identical to the bytes 83 and 84 explained heretofore with reference to FIG. 6A.

Having explained a preferred embodiment of the present invention it will now be appreciated that the novel control system shown in FIG. 1 may comprise a host HCMI 14 and any number of secondary HCMI 17 up to a number including 255 which are capable of monitoring and controlling in excess of 65,000 input/output devices. When this number of input/output devices are coupled to any transmission line 16 it is to be expected that the transmission line will spread over a very large area and be in environmental conditions that can create electrical noise and errors in the data received and transmitted from the input and output devices. It will now be appreciated that the complementary error checking features of the present invention are not only desirable but are needed for proper control operation.

Having explained a preferred embodiment of the present invention, a typical and preferred mode of operation will be explained as follows. Information produced at CPU 11 is transmitted to the host interface 13 and is stored in memory locations of the memory in interface translator 24 for sequential transmission to the host HCMI 14 where it is formatted before being applied to the transmission line 16. Not only is the information properly formatted and combined with an error checking byte but the HCMI also transmits an address clock and a sync pulse on two of the twisted pairs of the transmission line 16 for receipt at each one of the HCMIs 17. The HCMIs 17 each have a counter 38 which is first zeroed then counted so that all of the counters in the HCMIs are in synchronism. When each HCMI 17 reaches a predetermined count indicative of its address, it is then capable of receiving the signal placed on the transmission line 16.

Having explained the information in the bytes shown in FIG. 6 it will be appreciated that no preamble, no header address and no stop bytes are required for transmission of the information. Thus, it will be appreciated that the only address transferred in the bytes shown in FIG. 6 is the address of individual I/O devices at each of the individual nodes and these sub addresses may be identical at each of the nodes. Thus, it will be understood that the discrete address of an input/output device includes the HCMI or node address but this information is not transmitted on the transmission line except in the form of an address count and sync pulse. This feature alone decreases the amount of information by twenty-five percent when 65,000 input/output devices are coupled to a single transmission line. In the preferred embodiment of the present invention all information is transmitted from the interface translator memory 24 to the node being addressed for all I/O devices having information at that node. The information for each of the input/output devices at the nodes which registered a change is transmitted to the CPU while the address of the node exist. At the end of the transfer of information to the input/output devices at the specific node the host HCMI 14 will send out a signal indicative of the completion of transmission for that node at which time the HCMI at the node being address will now send information back to the CPU which is again formatted in the reverse sequence of formatting as explained hereinbefore for transmission and is passed through the interface translator 24 and stored in a buffer of the host processor interface 22 for transmission to the CPU 11. Stated differently each time the node or HCMI interface is addressed all the information from the interface translator 24 for that node is transmitted and similarly all of the information from that address node is transmitted back to the CPU before the address of the node is changed. At the completion of transmission of information back to CPU 11 the HCMI host 14 applies an address clock to its address counter and also counts the address counters in the secondary HCMIs, thus preparing the system for transmission of information between the next sequential address. If there is no information to be transferred at the next sequential address, the control system continues to count until it reaches a node address count where information is to be transferred from the CPU to the node address having an I/O device that requires the information. Similarly if an I/O device has information to be transferred back to the CPU at the time the sequential address reaches its node, a signal has been raised at the secondary HCMI which enables it to transfer information back to the CPU before sequencing to the next sequential node address. In this manner it is possible to count through every possible node on the transmission line in a period of approximately 170 microseconds. It will be appreciated that the input/output control devices 27 have their own sampling clocks 28 which are sampling each of its input devices 21 during a period of 1/40 of one second continuously independently of the operation of the host HCMI 14.

As explained hereinbefore it will be appreciated that the CPU 11 and its host processor interface 22 operate asynchronously. The HCMI interface 14 is conducting its sequence of operations and address node counts independently and asynchronously to the scanning of the input block devices by the input/output control 27 employing its sample clock 28. Further, when the host HCMI 14 conducts its cycles of operation, it only counts up to the highest node which is already applied to the transmission line 16 and does not include the complete count of the possible nodes which may be placed on the transmission line.

Another feature of the present invention permits any one of the nodes to be decoupled from the transmission line for maintenance purposes without affecting the operation of the system. It is not necessary to take the system down to perform maintenance at any particular secondary HCMI because the transmission line 16 is transformer isolated at the nodes. In a similar manner a new node or secondary CMI may be added to the transmission line if a coupling device is already provided. The maximum address count should be increased at the host HCMI to include the new node station.

What is claimed is:

1. In a control system having a plurality of distributed input/output interface modules, comprising
   a central processing unit (CPU) for controlling information to and from a plurality of input/output devices,
   a host interface having a host hardware controlled multinode interface (HCMI);
   a plurality of secondary hardware interfaces each having a secondary HCMI;
   data and control transmission line means parallel connected to each of said HCMIs;
   said CPU having means for transmitting and receiving data and control bytes of information employed to control said plurality of input/output devices;
   said bytes of information comprising a data byte, an error byte and an address/command byte which defines the absence or presence of another data byte as well as the address of the input/output device being addressed, and
   a HCMI address counter in each said secondary HCMI which defines the unique address of the secondary HCMI with which the host HCMI is to communicate, whereby
   said bytes of information communicated to or from said CPU and an input/output device are active when the address counter activates a unique secondary HCMI.

2. A systems as set forth in claim 1 which further includes an HCMI address clock for setting all address counters in said HCMIs to a predetermine address prior to transmitting said bytes of information.

3. A system as set forth in claim 2 wherein said address counter in said host HCMI further includes buffer means for generating and appending the address in said address counter to information being transfer from a HCMI to said CPU.

4. A system as set forth in claim 1 wherein said host HCMI further includes a biphase encoder for encoding digital information processed from a register for transmission on said transmission line means.

5. A system is said forth in claim 4 wherein said HCMIs further include phase error checking means for determining if the biphase encoded information is synchronized with a data clock, and data clock means in said HCMI coupled to said transmission line for transmitting a clock simultaneously with said biphase encoded information data.

6. A system as said forth in claim 4 which further includes a peak detector for sensing whether said biphase encoded information contains erroneous noise or data occurring simultaneously with said biphase encoded information.

7. A system as set forth in claim 1 in each said HCMI further include means for generating and adding a parity bit on each byte of information received from said transmission line.

8. A system as set forth in claim 1 wherein said HCMIs further includes a longitudinal redundancy check character (LRCC) generator for generating an error checking byte.

9. A system as set forth in claim 8 wherein said HCMIs further includes error checking means.

10. A system as set forth in claim 9 wherein said error checking means further comprises a combined parity and LRCC error checking circuit.

11. In a control system having a plurality of distributed input/output interface modules, comprising;
    a central processing unit (CPU) for controlling a plurality of input/output devices,,
    a host interface having a host hardware control multinode interface (HCMI);
    a plurality of secondary hardware interface modules each having a secondary HCMI;
    data and control transmission line means connected in parallel to each of said HCMIs;
    said CPU having means for transmitting and receiving bytes of information for controlling said plurality of input/output devices;
    said data and control transmission line means comprising a plurality of independent parallel lines,
    at least one of said independent parallel lines being dedicated for the transmission of data bytes of information and at least one other said line being dedicated for transmitting address clock information which defines the unique addresses of the secondary HCMIs with which the host HCMI is communicating, and
    a HCMI address counter in each secondary HCMI for defining said unique addresses and for activating a secondary HCMI.

12. A system as set forth in claim 11 wherein each said secondary HCMI comprises a logic protocol and control hardware circuit for transmitting information to and receiving information from discrete I/O devices.

* * * * *